Sept. 21, 1971  A. SCHOEPE ET AL  3,606,661
PRODUCTION ASSEMBLY MECHANISM FOR TELESCOPICALLY ASSEMBLED AND
INTERFERENCE FORMED PARTS INCLUDING TRANSFER ARM MECHANISM
Filed Aug. 22, 1969  4 Sheets-Sheet 1

INVENTORS
ADOLF SCHOEPE,
FREDRIC E. SCHMUCK
BY
MAHONEY, HORNBAKER
& SCHICK
ATTORNEYS

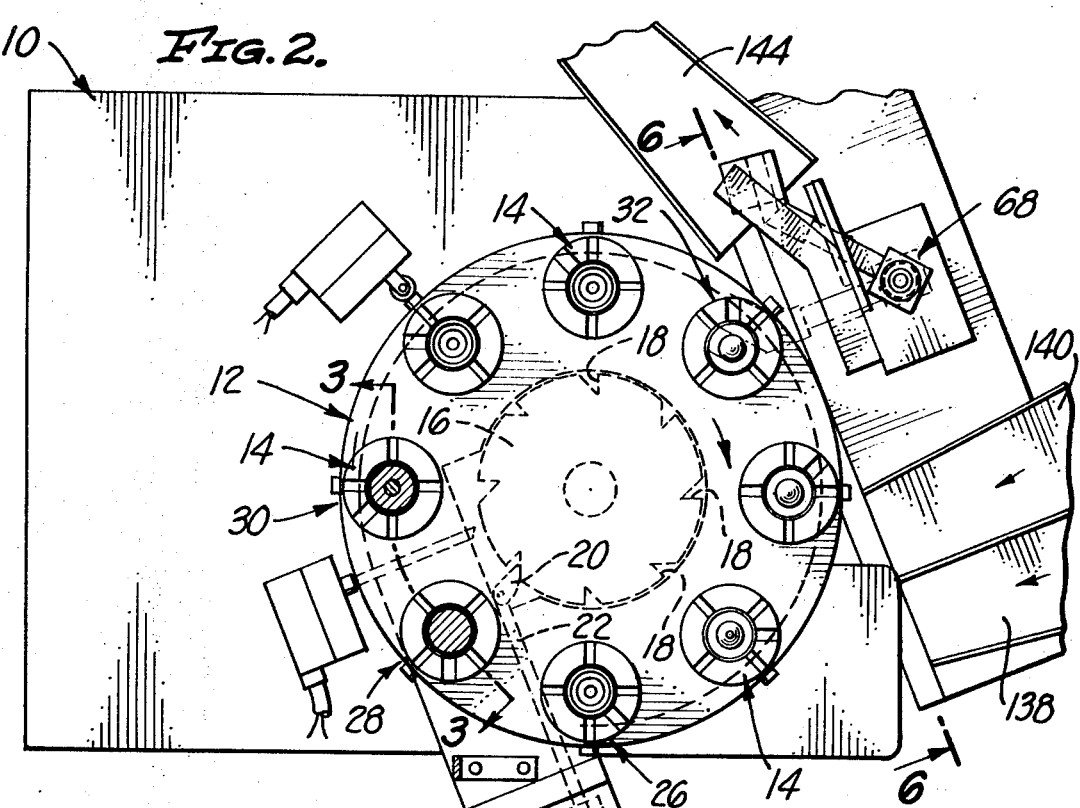
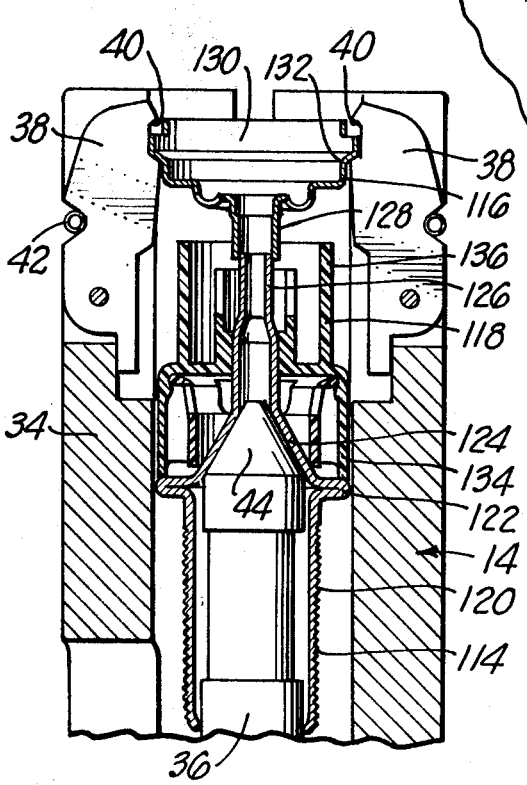

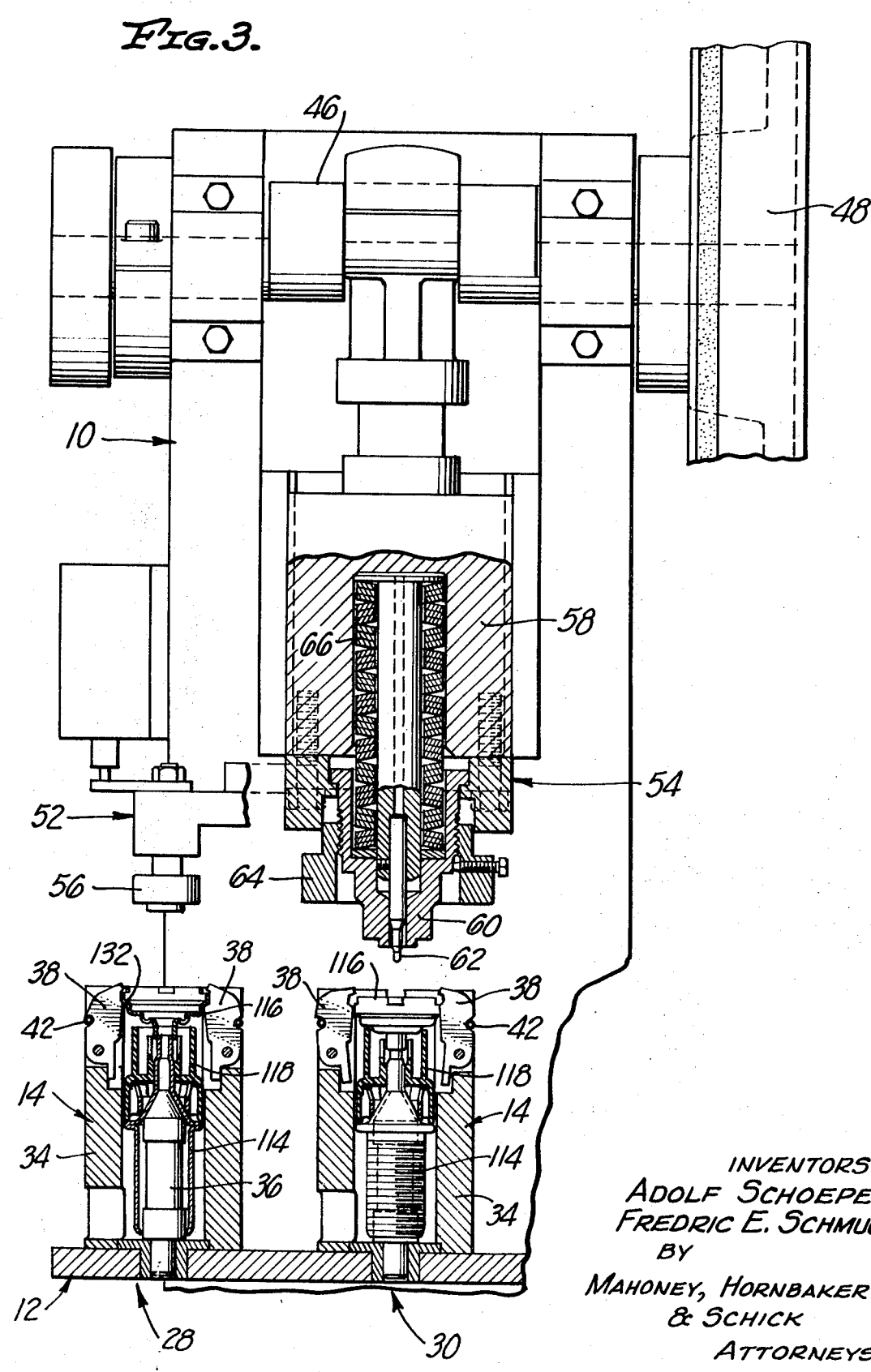

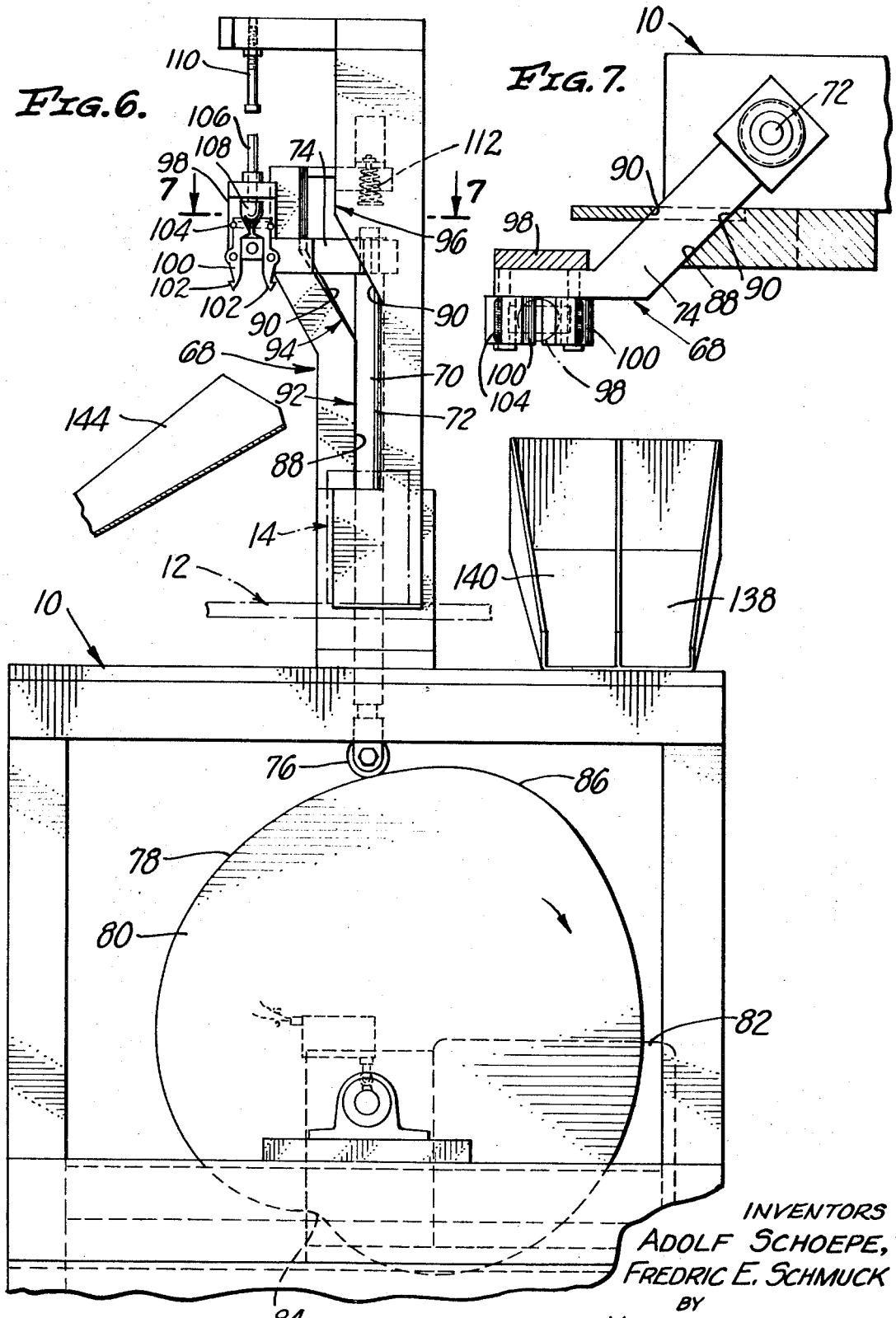

United States Patent Office 3,606,661
Patented Sept. 21, 1971

3,606,661
PRODUCTION ASSEMBLY MECHANISM FOR TELESCOPICALLY ASSEMBLED AND INTERFERENCE FORMED PARTS INCLUDING TRANSFER ARM MECHANISM
Adolf Schoepe, 1620 N. Raymond Ave., Fullerton, Calif. 92631, and Fredric E. Schmuck, 535 Century Drive, Anaheim, Calif. 92805
Filed Aug. 22, 1969, Ser. No. 852,316
Int. Cl. B23p 19/04
U.S. Cl. 29—208D						16 Claims

ABSTRACT OF THE DISCLOSURE

A series of spaced fixtures are mounted on a rotatable indexing table progressively movable between first and second and third assembly stations and a fourth pick-off station so that production parts, such as three parts of a ball cock lower assembly, may be recevied at the first assembly station in an initially telescoped condition, formed into an intermediate telescoped condition at the second assembly station by an intermediate assembly ram, formed into a final telescoped and interengaged condition at the third assembly station by a final assembly ram and automatically removed from the indexing table at the fourth pick-off station by a pick-off mechanism. The fixtures include resiliently urged pivotal holding fingers maintaining proper part alignment and permitting the various telescoping and reforming operations, while the intermediate and final assembly rams operate together, one preferably being mounted directly on the other. The pick-off mechanism includes a cam controlled, vertically and horizontally movable arm having releasable pick-up means thereon automatically engaging and retaining finally assembled parts at the fourth pick-off station and removing the parts both vetrically and horizontally to a location remote from the indexing table.

BACKGROUND OF THE INVENTION

This invention relates to a production assembly mechanism for telescopically assembled and interference formed parts preferably including a transfer arm mechanism automatically removing finally assembled parts from the production assembly mechanism and transporting the same to a remote location. More particularly, the production assembly mechanism of the present invention carries out precise telescoping and reforming operations on production parts, such as certain ultimately water transmitting parts of a ball cock lower unit, wherein the finally assembled parts must be relatively precisely positioned in the final assembly with certain of said parts properly interengaged so as to transmit water therethrough in predetermined paths and without unwanted water leakage. Further, the production assembly mechanism of the present invention is particularly adaptable to modern mass production assembly methods with various stages of assembly operations being performed on various initially, intermediately and finally assembled part assemblies virtually simultaneously, and with the finally assembled part assemblies being automatically removed to a location remote from the production assembly mechanism by a unique form of pick-off arm mechanism.

There are many occasions in modern mass production facilities where it is necessary to assemble production parts into a final assembly requiring very precise alignments and interengagements between the finally assembled parts, yet, in order to maintain costs within a reasonable range for ready salability of the final part assemblies, it is desirable to perform these assembly operations automatically and with maximum speed without reduction in quality. For instance, a prime example of such a production assembly situation and to which the broader principles of the present invention are specifically applied as herein illustrated and described is the required telescopic assembly and final reformed and interengaged parts of a particular ball cock lower unit assembly, such assembly being comprised of three parts, namely, a fluid inlet part and a valve seat part and a fluid outlet part. Furthermore, in such final assembly, the three production parts must be very precisely telescopically assembled and two of said parts reformed so as to be interengaged in the final assembly for retaining the parts in the finally assembled condition, the preciseness of the telescoping and reforming operations being sufficient to result in a final assembly which will not permit unwanted water leakage at various locations between the assembled parts during the passage of water through the assembly during final use thereof.

The positioning of the ball cock parts in the final assembled form is with the fluid outlet part loosely telescoped downwardly over an upper end portion of the fluid inlet part and resting downwardly on predetermined surface portions of the fluid inlet part. The valve seat part has a lower end portion telescoped loosely downwardly within the fluid outlet part, but press fit engaged telescoped over the upper end of the fluid inlet part, the telescoping portions of the fluid inlet and outlet parts being required to be very precisely aligned, as well as interengaged to retain the entire assembly. Equally as important, in the final assembly, an upper portion of the valve seat part overlies and is required to be precisely downwardly abutted with an upper end of the fluid outlet part, such precise abutment between the valve seat and fluid outlet parts being required to take place at the very termination of the precise press fit telescoping between the fluid inlet and outlet parts.

Thus, although the finally assembled ball cock lower unit may appear somewhat simple in construction, it is evident that the assembly operations to accomplish such final assembly must be relatively exact and precise if the proper assembled relationships between the various parts are to be provided. At the same time, it is desirable to perform these operations in a relatively fast and efficient manner following mass production methods so that assembly costs may be maintained at a minimum. Still further, in order to even more greatly minimize the hand operation costs, it is preferred to automatically remove the finally assembled ball cock lower units from the assembly mechanism and deposit the same at a remote location ready for further production operations finally culminating in complete ball cock units.

OBJECTS AND SUMMARY OF THE INVENTION

It is, therefore, an object of this invention to provide a production assembly mechanism for telescopically assembled and interference formed parts wherein production parts to be assembled may be introduced to the production assembly mechanism in a predetermined initially telescoped condition and by operation of the assembly mechanism may be automatically, through consecutive assembly operations, progressively formed into intermediate telescopically assembled and final telescopically assembled conditions in a very precise and closely controlled manner resulting in exactly arranged final part assemblies. According to certain of the particulars of the present invention, both the intermediate and final assembly operations may be performed on the parts while such parts are positioned on and held by identical assembly mechanism fixtures so that once the parts are introduced to the assembly mechanism in the initially telescoped condition positioned on a particular fixture, it is unnecessary to remove the same from that particular fixture until all assembly operations have been carried out thereon. Furthermore, each of the fixtures will retain its particular parts to be assembled in precise proper alignment as received in the initially telescoped condition for a partial press fit further telescopic assembly during the intermediate assembly operation and for a final completed telescopic assembly immediately followed by part reforming and interengagement during the final assembly operation.

It is a further object of this invention to provide a production assembly mechanism for telescopically assembled and interference formed parts wherein, due to the fact that both the intermediate and final assembly operations may be carried out on the parts while each group of parts is retained on the same fixture, the assembly mechanism is particularly adaptable for use of an indexing table for mounting such fixtures thereon, the indexing table being arranged for automatically moving the fixtures between the consecutive assembly stations between assembly operations. Thus, the parts to be assembled may be placed on an indexing table mounted fixture in the initially telescoped condition at a first assembly station, moved to and retained a second assembly station for the intermediate assembly operation by movement of the fixture through movement of the indexing table, and then similarly moved to a third production station for the performance of the final assembly operation, the particular fixture at all times retaining the parts in the required precise alignment during and between the various assembly operations. In addition, by providing a series of the part receiving and retaining fixtures at proper space locations on the indexing table, one group of parts may be in the process of being placed on a fixture at the first assembly station in the initially telescoped condition while the intermediate assembly operation is simultaneously being performed on another group of parts at the second assembly station, and further while the final assembly operation is being simultaneously performed on still another group of parts at the third assembly station, the intermediate and final assembly operations being performed by simultaneously movable rams of the assembly mechanism.

As hereinbefore discussed, the broader principles of the present production assembly mechanism are particularly adaptable for use in assembling the parts of a ball cock lower unit, which parts in final assembled form make up an important portion of a complete ball cock unit. As received on a particular fixture at the first assembly station, the ball cock lower unit parts include a fluid inlet part having a fluid outlet part loosely telescoped but precisely positioned over an upper portion thereof with a valve seat part having a lower portion loosely telescoped downwardly within the fluid outlet part and partially received over and ready for press fit telescopic reception on an upper end of the fluid inlet part. Also, in the initially telescoped condition, an upper portion of the valve seat part overlies and is spaced upwardly from an upper edge of the fluid outlet part. In the intermediate assembly operation, the intermediate assembly ram at the second assembly station engages and forces the valve seat part into an intermediate press fit telescoping position with the upper end of the fluid inlet part, while the overlying portion of the valve seat part more closely approaches, but remains spaced above the upper edge of the fluid outlet part. The final assembly ram at the third assembly station again engages the valve seat part and forces the same downwardly into a final assembled position press fit telescoped with the upper end of the fluid inlet part and reforms such part for final interengagement, and also forces the overlying portion of the valve seat part downwardly into precisely aligned abutment with the upper end of the fluid outlet part, all such operations preferably being performed while the parts are retained on the same fixture of the indexing table.

It is a further object of this invention to provide a production assembly mechanism of the foregoing general character and capable of carrying out the precise assembly operations in the manner described wherein said assembly mechanism may also include a unique pick-off mechanism automatically operable to directly engage and remove the finally assembled parts from the fixtures and transport said finally assembled parts to a location remote from the assembly mechanism ready for further production operations in order to integrate the same into fully assembled ball cock units. Where the movable indexing table and multiple fixture arrangement is provided, the pick-off assembly is positioned at a fourth part pick-off station one or more indexing movements of the indexing table from the third final assembly station, the pick-off mechanism being comprised of a movable, cam controlled pick-off arm having pick-up means thereon automatically engaging and retaining finally assembled parts of a properly stationed fixture, transporting said finally assembled parts from the fixture to the remote location and automatically discharging the finally assembled parts at such remote location. As applied to the production assembly of the parts of a ball cock lower unit, the pick-up means on the pick-off arm may include resiliently outwardly urged pivotal fingers which automatically internally engage an upper open end of the valve seat part of the final assembly, the arm then moving the pick-up means both vertically and horizontally as determined by the cam control thereof to the remote location where discharge activating or release means engages the pick-up means to pivot the gripping fingers inwardly and release the ball cock lower unit assembly.

Other objects and advantages of the invention will be apparent from the following specification and the accompanying drawings which are for the purpose of illustration only.

BRIEF DESCRIPTION OF THE DRAWINGS

FIG. 2 is an enlarged, fragmentary, horizontal sectional view looking in the direction of the arrows 2—2 in FIG. 1 and with the assembly mechanism still at rest between automatic assembly operations thereof;

FIG. 3 is an enlarged, fragmentary, vertical sectional view looking in the direction of the arrows 3—3 in FIG. 2 still showing the assembly mechanism at rest but containing production parts in various stages of assembly and ready for the operation of rams of the assembly mechanism;

FIG. 4 is an enlarged, fragmentary, vertical sectional view taken from FIG. 3 and showing the left hand production fixture of FIG. 3 in enlarged detail;

FIG. 6 is a fragmentary, vertical sectional view looking in the direction of the arrows 6—6 in FIG. 2 and showing a pick-off mechanism of the assembly mechanism at rest between pick-off operations of the finally assembled parts; and FIG. 7 is an enlarged, fragmentary, horizontal sectional view looking in the direction of the arrows 7—7 in FIG. 6.

DESCRIPTION OF THE BEST EMBODIMENT CONTEMPLATED

Figure 1:
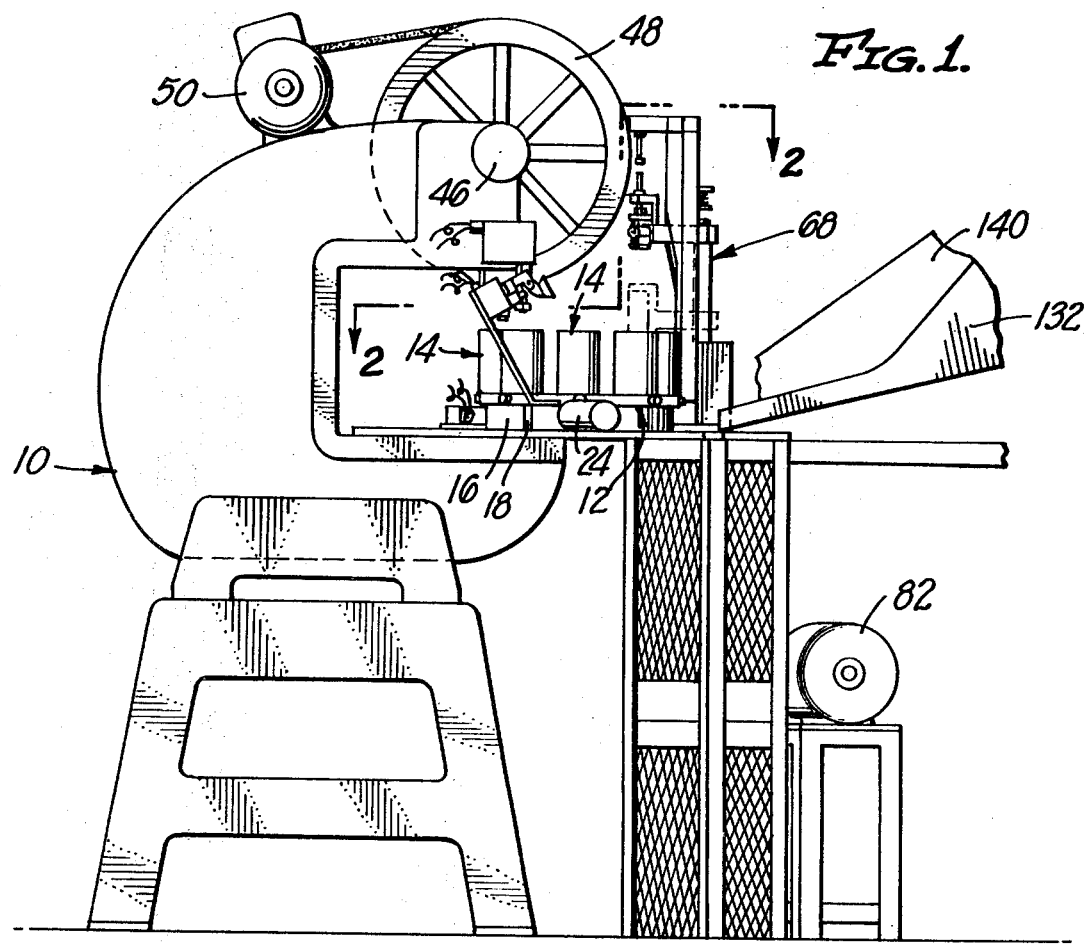
FIG. 1 is a fragmentary, side elevational view of an embodiment of production assembly mechanism incorporating the principles of the present invention, the view being taken from the operator's side of the assembly mechanism and with the mechanism at rest between automatic operations thereof.

Referring to the drawings, the embodiment of the production assembly mechanism shown includes a main frame generally indicated at 10 rotatably mounting a horizontally positioned, circular indexing table generally indicated at 12, which indexing table, in turn, mounts a series of vertically upwardly projecting part holding fixtures generally indicated at 14 secured at equally spaced locations circumferentially around the indexing table at an upper side adjacent the periphery. As best seen in FIG. 2, the indexing table 12 includes a lower reduced driving portion 16 formed with a series of circumferentially equally spaced indexing notches 18 about the periphery thereof equal in number to the part holding fixtures 14. The indexing notches 18 of the indexing table driving portion 16 are intermittently engaged by a pivotal indexing dog 20 at the forward end of an indexing push rod 22 forwardly and rearwardly movable by a two-way fluid cylinder 24.

Thus, with the fluid cylinder 24 in its at rest position as shown in FIG. 2, actuation thereof will cause forward or inward extension of the indexing push rod 22 causing the indexing dog 20 engaged in one of the indexing notches 18 to rotate the indexing table 12 exactly one circumferential spacing of the part holding fixtures 14, the reverse rearward or outward movement of the indexing push rod by the fluid cylinder causing the indexing dog to pivot outwardly of the particular indexing notch and ultimately reengage in the next indexing notch in the counter-clockwise direction as viewed. Furthermore, between each of the indexing movements of the indexing table 12 by the indexing push rod 22 and fluid cylinder 24, one of the part holding fixtures 14 is always positioned at each of a first assembly station generally indicated at 26, a second assembly station generally indicated at 28, a third assembly station generally indicated at 30 and a fourth part pick-off station generally indicated at 32. It will be noted that the first through third assembly stations 26 through 30 and the fourth part pick-off station 32 could be circumferentially consecutive positions of the part holding fixtures 14 or could be circumferentially spaced apart by intermediate part holding fixtures without affecting the general principles of the present invention as long as said stations are in progressive order clockwise of the indexing table 12 as viewed in FIG. 2. In the particular instance illustrated, the first through third assembly stations 26 through 30 are circumferentially consecutive and the fourth part pick-off station 32 is spaced two of the part holding fixtures 14 from the third assembly station for convenience in positioning the various elements of the production assembly mechanism.

All of the part holding fixtures 14 secured on the indexing table 12 are substantially identical and as best seen in FIGS. 2 through 5, each includes a hollow cylindrical outer positioning collar 34 telescoped over an inwardly spaced, generally cylindrical, inner positioning mandrel 36, both of which have the axes thereof coextensive and vertically upright. The outer positioning collar 34 extends vertically upwardly spaced above the inner positioning mandrel 36 and has a series of circumferentially spaced positioning fingers 38 pivotally mounted thereon pivotally movable in vertical radial planes, said fingers having horizontally aligned, inwardly opening positioning notches 40 formed therein and being resiliently urged pivotally inwardly by a circumferentially surrounding garter spring 42. The inner positioning mandrel 36 terminates upwardly intermediate the height of the outer positioning collar 34 in a frusto-conical nose 44, thereby completing the fixture assembly.

Overlying the indexing table 12, the main frame 10 mounts a typical arrangement of ram driving crank arm 46 rotatable in the main frame and driven through a typical fly wheel 48 belt connected to an electric gear head motor 50. The crank arm 46, in turn, movably supports an intermediate assembly ram generally indicated at 52 and a final assembly ram generally indicated at 54, the details of which are best seen in FIG. 3. As shown, the intermediate assembly ram 52 is preferably mounted directly on the final assembly ram 54 so that the two rams are simultaneously reciprocally movable from an upper, at rest position vertically downwardly and upwardly by the same crank arm 46.

The intermediate assembly ram 52 downwardly mounts a part engaging assembly punch 56 movable by the ram downwardly into axial alignment with a particular one of the part holding fixtures 14 then positioned at the second assembly station 28. As will be hereinafter more clearly explained, each reciprocal stroke of the intermediate assembly ram 52 causes the assembly punch 56 thereof to carry out an intermediate telescoping operation on production parts then retained in the particular of the part holding fixtures 14 then at the second assembly station 28.

The final assembly ram 54 downwardly mounts a two-stage, assembly and reforming punch holder 58, which punch holder, in turn, downwardly mounts an initially acting outer assembly punch 60 which telescopes a secondarily acting inner reforming punch 62. The assembly punch 60 includes a radially surrounding, vertically adjustable stop collar 64 and is mounted on the punch holder 58 for limited vertical movement relative thereto, normally being resiliently urged vertically downwardly with respect to the punch holder by an assembly of typical spring washers 66 surrounding the reforming punch 62. The reforming punch 62 extends coaxially of the assembly punch 60 and is downwardly movable exactly with the punch holder 58, normally projecting a minor distance axially downwardly from the assembly punch when the assembly punch is in its lowermost position relative to the punch holder, but projecting a greater distance downwardly when the assembly punch moves upwardly relative to the punch holder compressing the spring washers 66.

The assembly and reforming punches 60 and 62 are positioned on the final assembly ram 54 movable upwardly and downwardly by said ram through movement of the crank arm 46, said punches moving downwardly into vertical alignment with the axis of one of the part holding fixtures 14 then at the third assembly station 30. Furthermore, as will be hereinafter more fully described, these assembly and reforming punches 60 and 62 during movement of the final assembly ram 54 perform a final telescoping operation including a part reforming operation on parts then positioned in the particular part holding fixture 14 then at the third assembly station, such fixture and parts just having been moved from the second assembly station 28 by the indexing table 12.

The production assembly mechanism of the present invention further preferably includes a transfer or pick-off arm mechanism generally indicated at 68 mounted on the main frame 10, the positioning thereof relative to the indexing table 12 being seen in FIGS. 1 and 2 with the details of construction thereof being best seen in FIGS. 6 and 7. As shown, the pick-off arm mechanism 68 includes a vertically movable, inverted L-shaped arm 70 having a vertical portion 72 and a horizontal portion 74 horizontally pivotally connected to the vertical portion. The vertical portion 72 of the arm 70 rests vertically downwardly through a cam roller 76 on a circumferentially continuous cam surface 78 of a rotatably movable cam plate 80, said cam plate being intermittently driven in single revolution movements through an electric gear head motor 82 operably connected thereto in the usual manner.

As clearly seen in FIG. 6, the cam plate 80 is particularly formed with the cam surface 78 thereof guiding the vertical portion 72 of the arm 70 upwardly and downwardly between a lower part pick-off position corresponding to recess 84 on the cam and an upper part discharge or release position corresponding to point 86 on the cam. The horizontal portion 74 of the arm 70 projects forwardly from its pivotal connection with the vertical portion 72 through a generally vertically extending cam slot 88 formed in the main frame 10 bordered by side cam surfaces 90 and including a lower vertical portion 92, an intermediate angled portion 94 and an upper vertical portion 96 horizontally displaced from the lower vertical portion 92. Thus, as the arm vertical portion 72 moves upwardly and downwardly as caused by rotation of the cam plate 80, the arm horizontal portion 74 is guided horizontally by the cam slot 88, the arm horizontal portion 74 vertically overlying the particular of the part holding fixtures 14 at the fourth part pick-off station 32 of the indexing table 12 in the part pick-off position and being horizontally moved and displaced from the indexing table in the part discharge or release position as determined by the formation of the cam slot 88, all of which will be hereinafter more clearly pointed out.

A part pick-up assembly 98 is mounted at the projecting end of the arm horizontal portion 74 and is formed by a group or series, preferably two opposed pick-up fingers 100 mounted pivotal in vertical planes and having lower hook-like ends 102 normally resiliently urged outwardly by a surrounding garter spring 104. Furthermore, the part pick-up assembly 98 includes a vertically reciprocal discharge or release plunger 106 having an enlarged lower end 108 engaged with the pick-up fingers 100 and forcing said pick-up fingers to pivot inwardly upon downward movement of the release plunger 106, although such release plunger is normally retained upwardly in the position shown in FIG. 6 by the inward urging of the garter spring 104 and the normal outward pivoting of the pickup fingers 100. Downward urging of the release plunger 106 is, however, caused by vertically upward engagement thereof with a downwardly projecting discharge or release activating rod 110 vertically adjustably mounted on the main frame 10, such engagement taking place as the arm 70 moves vertically upwardly to reach the part discharge or release position as caused by the cam roller 76 on the arm vertical portion 72 reaching the cam plate point 86, the arm vertical portion 72 simultaneously engaging a cushion spring 112 on the main frame 10 at this maximum vertically upward position.

Figure 5:
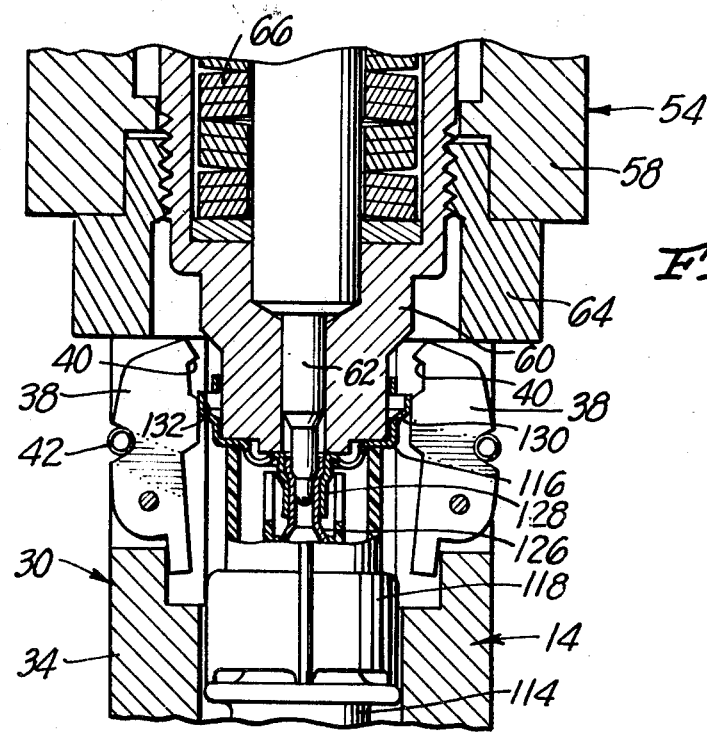
FIG. 5 is a view similar to FIG. 4 and showing the right hand production fixture of FIG. 3 at the completion of the final assembly operation.

As hereinbefore briefly discussed, the embodiment of the production assembly mechanism herein described and illustrated is particularly adapted for telescopically assembling parts of a ball cock lower unit which, when assembled, may be integrated into a completed ball cock of the type for use in controlling the water level in a water flush tank. As best seen in FIGS. 3, 4 and 5, each ball cock lower unit assembly is formed by a fluid inlet part 114, a valve seat part 116 and a fluid outlet part 118. All of the fluid inlet, valve seat and fluid outlet parts 114, 116 and 118 are generally cylindrical and generally hollow, although specifically formed for interfitting telescopic assembly as will be hereinafter described, the fluid inlet and valve seat parts preferably being formed of metal and the fluid outlet part preferably being formed of rigid plastic.

More specifically to the various shapes of the parts, the fluid inlet part 114 is formed by an enlarged lower cylindrical portion 120 terminating upwardly in an annular flange portion 122, above which is an intermediate frusto-conical portion 124 which, in turn, terminates upwardly in a reduced upper end portion 126. The valve seat part 116 includes a reduced lower neck part 128 and an enlarged valve housing portion 130 forming an enlarged open upper end 132. Completing the ball cock lower unit, the fluid outlet part 118 includes a lower end portion 134 and an upper end portion 136.

Important to the assembly operations carried out by the production assembly mechanism of the present invention, the reduced upper end portion 126 of the fluid inlet part 114 and the reduced lower neck portion 128 of the valve seat part 116 are sized such that the reduced upper end portion of the fluid inlet part may receive the reduced lower neck portion of the valve seat part telescoped downwardly thereover with a press fit therebetween and permitting a simultaneous reforming of both so as to provide interengagement therebetween. Also, the relative sizing between the fluid inlet part 114 and the fluid outlet part 118 is such that the fluid outlet part may be slip fit or loosely telescoped downwardly over the intermediate frusto-conical portion 124 and the reduced upper end portion 126 of the fluid inlet part with the lower end portion of the fluid outlet part positioned downwardly resting on the flange portion 122 and the intermediate frusto-conical portion 124 of the fluid inlet part. At the same time, with the above described relative telescoping between the various fluid inlet, valve seat and fluid outlet parts 114, 116 and 118, the enlarged valve housing portion 130 of the valve seat part 116 is of a size to vertically overlie the upper end portion 136 of the fluid outlet part 118 so that an annular, substantially water sealing abutment can take place between corresponding abutting surfaces thereof.

In use of the embodiment of the production assembly mechanism of the present invention as installed in a mass production line for the assembly of the ball cock lower unit parts into ball cock lower units, the fluid inlet, valve seat and fluid outlet part 114, 116 and 118 are received at the indexing table 12 in conveyor chutes 138, 140 and 142 and are placed in the part holding fixtures 14 as these fixtures are positioned by the indexing table at the first assembly station 26, one each of the three parts being assembled in the part holding fixtures in an initially telescoped condition as shown in FIG. 4. At the same time, and as will be hereinafter more clearly described, during this assembling of one set of the ball cock lower unit parts into the initially telescoped condition in the one of the part holding fixtures 14 at the first assembly station 26, another set of said parts has been presented by one of the fixtures at the second assembly station 28 in the initially telescoped condition as shown at the left in FIG. 3 and is being further assembled into an intermediate telescoped condition, while still another set of said ball cock lower unit parts has been presented by one of said fixtures in the intermediate telescoped condition at the third assembly station 30 as shown at the right in FIG. 3 and is being further assembled into a final telescoped and reformed condition, such final telescoped and reformed condition being shown in FIG. 5. The exact positioning of the various parts of each of the sets of ball cock lower unit parts in the various noted conditions can best be described and understood during a description of the actual operation of the production assembly mechanism and the various assembly operations at the first, second and third assembly stations 26, 28 and 30.

At the first assembly station 26 and as illustrated in FIG. 4, one of the fluid inlet parts 114 is assembled downwardly within the fixture outer positioning collar 34 and downwardly over the inner positioning mandrel 36 so that the intermediate frusto-conical portions 124 of the fluid inlet parts rests downwardly on and is precisely positioned by the frusto-conical nose 44 on the fixture inner positioning mandrel. One of the fluid outlets parts 118 is also positioned downwardly within the fixture outer positioning collar 34 slip fit or loosely telescoped over the fluid inlet part 114 so that the lower end portion 134 of the fluid outlet part rests on the flange portion 122 of the fluid inlet part, again in a precisely positioned telescoped assembly. Completing the initially telescoped assembly, one of the valve seat parts 116 is inserted downwardly within the fixture outer positioning collar 34 with the reduced lower neck portion 128 of said valve seat part initially telescoped downwardly over the reduced upper end portion 126 of the fluid inlet part 114, and with the enlarged valve housing portion 130 of said valve seat part peripherally engaged in the positioning notches 40 of the fixture positioning fingers 38 to complete the initially telescoped condition of the ball cock lower unit parts.

This insertion of the valve seat part 116 and engagement by the fixture positioning fingers 38 is permitted by the outward pivoting of these positioning fingers as permitted by the fixture garter spring 42, the positioning notches 40 of the positioning fingers exactly locating the valve seat part in this initially telescoped assembly. Also, in this initially telescoped assembly or condition, the valve housing portion 130 of the valve seat part 116 precisely overlies, but is spaced a major distance upwardly from the edge of the upper end portion 136 on the fluid outlet part 118. Thus, the set of ball cock lower unit parts are retained precisely aligned by the part holding fixture 14 at the first assembly station 26 in the initially telescoped condition and are ready for movement to the second assembly station 28 for the intermediate telescoping operation.

The operator then actuates the fluid cylinder 24 causing the indexing push rod 22 to extend and the indexing dog 20 thereof engaged in one of the indexing table indexing notches 18 to move the indexing table rotatably clockwise as viewed in FIG. 2 exactly one fixture spacing now placing the particular part holding fixture 14 and its set of ball cock lower unit parts in the initially telescoped condition at the second assembly station 28 as illustrated at the left in FIG. 3. Appropriate switches are provided on the production assembly mechanism for actuating the motor 50 to rotate the crank arm 46 one complete revolution after the fluid cylinder 24 has completed the indexing movement of the indexing table 12 the one fixture spacing and, ignoring the consequences of the movement of the final assembly ram for the moment, the rotation of the crank arm 46 one revolution causes downward and upward reciprocal movement of the intermediate assembly ram 52 at the second assembly station 28 with the assembly punch 56 of the intermediate assembly ram engaging downwardly within the open upper end 132 of the valve seat part 116 and forcing this valve seat part to telescope downwardly a greater distance with the fluid inlet part 114. This further telescoping of the fluid inlet and valve seat parts 114 and 116 forces a release of the valve housing portion 130 of the valve seat part from the positioning notches 40 on the fixture positioning fingers 38 by a pivotal spreading of these fingers, but the completed positioning of the valve seat part 116 relative to the fluid inlet part 114 still places the valve housing portion 130 of this valve seat part spaced upwardly from the upper end portion 136 of the fluid outlet part 118 although particularly alinged therewith.

The reciprocal stroke of the intermediate assembly ram 52 at the second assembly station 28, therefore, assembles the particular ball cock lower unit parts into an intermediate telescoping position, such condition of the ball cock lower unit parts being that illustrated at the right in FIG. 3, and such intermediate assembled parts are then moved to the third assembly station 30 as shown at the right in FIG. 3 by the next indexing movement of the indexing table 12. Furthermore, the next single rotation of the crank arm 46 reciprocating the intermediate and final assembly rams 52 and 54 moves the final assembly ram downwardly engaging the assembly punch 60 thereof into the open upper end 132 of the valve housing portion 130 on the valve seat part 16 beginning the still further assembly of the ball cock lower unit parts from the intermediate telescoped condition into the final telescoped condition.

In the final telescoping operation at the third assembly station 36 by the final assembly ram 54, the initial engagement of the assembly punch 60 with the valve seat part 116 further telescopes the reduced lower neck portion 128 of the valve seat part downwardly with the reduced upper end portion 126 of the fluid inlet part 114 and, at the same time, tightly abuts in perfect alignment the overlying valve housing portion 130 of the valve seat part 116 with the upper end portion 136 of the fluid outlet part 118 in the manner shown in FIG. 5. Still at the same time, the stop collar 64 of the final assembly ram 54 engages the vertical extremities of the outer positioning collar 34 of the part holding fixture 14 beginning the forcing of the assembly punch 60 of the final assembly ram upwardly relative to the downwardly moving punch holder 58 of the final assembly ram and beginning to compress the spring washers 66 against the normal resilient resistance thereof. Thus, as the final telescoping between the fluid inlet and valve seat parts 114 and 116 and the abutment between the valve seat and fluid outlet parts 116 and 118 are completed, the reforming punch 62 of the final assembly ram 54 is projected downwardly a greater distance from the assembly punch 60 of said final assembly ram causing the metal working operation wherein the reduced upper end portion 126 of the fluid inlet part 114 and the reduced lower neck portion 128 of the valve seat part 116 are reformed interengaged completing the final telescoping and reforming operation and assembling the ball cock lower unit parts in a final assembled condition as shown in FIG. 5.

Subsequent progressive indexing movement of the indexing cable 12 ultimately moves the part holding fixture 14 containing the ball cock lower unit parts in the final assembled condition into the fourth part pick-off station 32 wherein, simultaneously with reciprocal movements of the intermediate and final assembly rams 52 and 54 for operation thereof on other sets of lower ball cock unit parts in other of the appropriately positioned part holding fixtures 14, operation of the pick-off arm mechanism 68 begins. As shown in FIG. 6, the pick-off arm mechanism 68 is in the stop or at rest position between transfer or pick-off operations and it will be noted that the rotatable cam plate 80 thereof has moved slightly beyond the cam point 86 in clockwise rotation as viewed so that the part pick-up assembly 98 of the pick-off arm mechanism is spaced downwardly from the release activating rod 110 and ready to pick up a ball cock lower unit in the final assembled condition. The motor 82, therefore, begins rotation of the cam plate 80 in the clockwise direction so as to progressively move the arm 70 downwardly which also moves the arm horizontal portion 74 downwardly along the cam slot 88 causing the side cam surfaces 90 thereof to pivot the arm horizontal portion from a position displaced from the indexing table 12 to a position ultimately overlying and exactly vertically aligned with the fourth part pick-off station 32 of the indexing table.

As the rotatable cam plate 80 of the pick-off arm mechanism 68 progresses to the point in its rotation wherein the cam roller 76 or the arm 70 is at the cam recess 84, the pick-up fingers 100 of the part pick-off assembly 98 engage downwardly in the open upper end 132 of the valve seat part 116 in the finally assembled ball cock lower unit. Such internal engagement of the pick-up fingers 100 into the valve seat part 116 of the assembly takes place automatically by inward pivoting of the hook-like ends 102 of said pick-up fingers as permitted by the surrounding garter spring 104. Furthermore, due to the valve seat part 116 of the assembly being received into the hook-like ends 102 of the pick-up fingers 100 in the final engagement, such engagement is extremely positive for resisting vertical disengagement between the pick-up fingers and the assembly of the ball cock lower unit.

Still continued rotation of the cam plate 80 of the pick-off arm mechanism 68, therefore, then progressively moves the arm 70 vertically upwardly while moving the arm horizontal portion 74 reversely upwardly through the cam slot 88 causing the side cam surfaces 90 to pivot the arm horizontal portion horizontally from alignment with the fourth part pick-off station 32 of the indexing table 12 to the remote location horizontally displaced from the indexing table. At the same time, the part pick-up assembly 98 on the arm horizontal portion 74 withdraws the finally assembled ball cock lower unit from its part holding fixture 14 at the fourth part pick-off station 32 and transfers such ball cock lower units to the remote location, at which time the cam plate 80 has positioned the cam point 86 beneath the cam roller 76 of the arm 70 raising said arm sufficiently for the release activating rod 110 on the main frame 10 to engage and depress the release plunger 106 of the part pick-off assembly 98. Depression of the release plunger 106 causes the enlarged lower end 108 thereof to pivot the pick-up fingers 100 inwardly disengaging and releasing the finally assembled ball cock lower unit and depositing the same downwardly into a conveyor chute 144, thereby permitting the finally assembled ball cock lower unit to move on to a further production operation.

Although each of the various assembly and part pick-off operations were described individually at the appropriate of the first, second and third assembly stations 24, 26 and 28 and at the fourth part pick-off station 32, it is, of course, to be understood that all four operations are taking place at the same time at the various assembly stations on different sets of the ball cock lower unit parts during one operation of the production assembly mechanism of the present invention. In other words, immediately following an indexing movement of the indexing table 12 a set of ball cock lower unit parts is being assembled into the initial telescoped condition at the first assembly station 26, another set is being assembled from the initially telescoped to the intermediate telescoped condition at the second assembly station 28, still another set is being assembled from the intermediate telescoped to the final telescoped condition at the third assembly station 28, and still another set is being removed from the fourth part-pick-off station 32 to the remote location, all taking place at the same time.

Thus, according to the principles of the present invention, a unique production assembly mechanism is provided wherein sets of production parts, such as the parts of ball cock lower units, may be introduced to the assembly mechanism in an initially telescoped condition and through consecutive automatic assembly operations may be very precisely assembled progressively into intermediate telescoped condition and then final telescoped and reformed condition to complete the assembly of said sets. Furthermore, a unique pick-off arm mechanism may be included in the production assembly mechanism for finally automatically removing the sets of parts in the finally assembled condition and transferring the same to a remote location displaced from the assembly mechanism. The production assembly mechanism of the present invention is, therefore, particularly adapted for use in a modern mass production line with the consequent production efficiency and cost reduction.

We claim:

1. In a production assembly mechanism for telescopically assembled and interference formed parts, such as parts of a ball cock lower unit, the combination of: a frame; a series of spaced fixtures, each of said fixtures including part positioning means thereon for receiving parts to be assembled in an initially telescoped condition and for holding said parts during an intermediate telescoping operation and a final telescoping and interference forming operation; fixture moving means mounting said fixtures on said frame for simultaneous indexing movement progressively into and between first and second and third assembly stations with there always being one of said fixtures at each of said stations between said indexing movements; each of said fixtures when in said first assembly station being positioned accessible to receive said parts to be assembled thereon with said part positioning means retaining said parts in said initially telescoped condition and holding said parts ready for indexing movement to said second assembly station; an intermediate assembly ram at said second assembly station mounted movable toward and away from assembly contact with said fixture held parts at said second assembly station, said intermediate assembly ram including part engagement means thereon for engaging and forcing said parts from said initially telescoped to an intermediate telescoped condition to carry out said intermediate telescoping operation during said assembly contact of said intermediate assembly ram; a final assembly ram at said third assembly station mounted movable toward and away from assembly contact with said fixture held parts at said third assembly station, said final assembly ram including part engagement and reforming means thereon initially actionable for engaging and forcing said parts from said intermediate telescoped to a final telescoped condition and then secondarily actionable for forming portions of said parts interengaged in said final telescoped condition to carry out said final telescoping operation during said assembly contact of said final assembly ram; and ram moving means operably connected to said intermediate and final assembly rams for simultaneously moving said rams toward and away from said assembly contacts between said indexing movements of said fixture moving means and while one of said fixtures is at each of said assembly stations.

2. A production assembly mechanism as defined in claim 1 in which said intermediate assembly ram is operably connected to said final assembly ram and through said final assembly ram operably connected to said ram moving means; and in which said ram moving means is adapted to move said final assembly ram and to simultaneously move said intermediate assembly ram through said final assembly ram by said operable connection between said rams.

3. A production assembly mechanism as defined in claim 1 in which said fixture moving means includes a rotatable indexing table on said frame and mounting said fixtures thereon in said fixture spaced relationship simultaneously movable with said table in indexing movement progressively into and between said first and second and third assembly stations, indexing means operably connected to said indexing table for moving said indexing table in said indexing movement and for maintaining one of said fixtures at each of said assembly stations between said indexing movements; and in which said fixture part positioning means include means for securely retaining said parts during limited movement thereof caused by said intermediate assembly ram intermediate telescoping and said final assembly ram final telescoping and reforming.

4. A production assembly mechanism as defined in claim 1 in which said part engagement and reforming means of said final assembly ram includes a part telescoping portion adapted to initially engage such parts during initial assembly contact of said final assembly ram and to force said parts from said intermediate telescoped to a final telescoped condition, and a part reforming portion adapted to engage and form portions of said parts interengaged after said parts are placed in said final telescoped condition by said part telescoping portion.

5. A production assembly mechanism as defined in claim 1 in which said telescopically assembled and interference formed parts are parts of a ball cock lower unit, each assembly including a fluid inlet part and a fluid outlet part and a valve seat part, said parts in said initially telescoped condition having said fluid outlet part telescoped downwardly over an upper portion of said fluid inlet part with said valve seat part initially telescoped downwardly over an upper end of said fluid inlet part within said fluid outlet part and having certain portions spaced upwardly overlying an upper end of said fluid outlet part; in which said fixtures project vertically upwardly and are adapted to receive said assemblies of said ball cock lower unit parts in said initially telescoped condition downwardly therein when said fixtures are in said first assembly station; in which said part engagement means of said intermediate assembly ram includes means for engaging and forcing said valve seat parts of said ball cock lower unit parts from said initially telescoped to an intermediate telescoped condition with said valve seat parts more fully downwardly telescoped over said fluid inlet parts but still having said certain portions still spaced upwardly overlying said upper end of said fluid outlet parts when said fixtures are at said second assembly station during carrying out said intermediate telescoping operation; and in which said part engagement and reforming means of said final assembly ram includes means initially actionable for engaging and forcing said valve seat parts of said ball cock lower unit parts from said intermediate telescoped to said final telescoped condition still further telescoped downwardly with said fluid inlet parts now having said certain portions engaged with said upper end of said fluid outlet parts and means secondarily actionable for forming portions of said fluid inlet and valve seat parts interengaged in said final telescoped condition at said third assembly station during carrying out said final telescoping operation.

6. A production assembly mechanism as defined in claim 1 in which said fixture moving means mounts said fixtures on said frame for said simultaneous indexing movement progressively into and between said first and second and third assembly stations and a fourth part pick-off station with there always being one of said fixtures at each of said stations between said indexing movements; and in which part pick-off means is mounted at said part pick-off station for engaging and retaining said parts from said third assembly station at said part pick-off station between said indexing movements and for transferring said parts to a discharge location displaced from said part pick-off station, said part pick-off means including means actionable for releasing said parts at said discharge location upon arrival of said part pick-off means at said discharge location.

7. A production assembly mechanism as defined in claim 1 in which said fixture moving means mounts said fixtures on said frame for said simultaneous indexing movement progressively into and between said first and second and third assembly stations and a fourth part pick-off station with there always being one of said fixtures at each of said stations between said indexing movements; in which said fixture moving means includes a rotatable indexing table on said frame and mounting said fixtures thereon in said fixture spaced relationship simultaneously movable with said table in indexing movement progressively into and between said first and second and third assembly stations and said fourth part pick-off station, indexing means operably connected to said indexing table for moving said indexing table in said indexing movement and for maintaining one of said fixtures at each of said stations between said indexing movements; and in which part pick-off means is mounted at said part pick-off station adjacent said indexing table including a cam controlled movable arm having releasable pick-up means thereon for engaging and retaining said parts from said third assembly station at said part pick-off station between said indexing movements and for transferring said parts to a discharge location displaced from said pick-off station and discharge activating means at said discharge location for engaging and actuating said arm pick-up means to release said parts at said discharge location.

8. A production assembly mechanism as defined in claim 1 in which said fixture moving means includes a rotatable indexing table on said frame and mounting said fixtures thereon in said fixture spaced relationship simultaneously movable with said table in indexing movement progressively into and between said first and second and third assembly stations and a fourth part pick-off station, indexing means operably connected to said indexing table for moving said indexing table in said indexing movement and for maintaining one of said fixtures at each of said stations between said indexing movements; in which said telescopically assembled and interference formed parts are parts of a ball cock lower unit, each assembly including a fluid inlet part and a fluid outlet part and a valve seat part, said parts in said initially telescoped condition having said fluid outlet part telescoped downwardly over an upper portion of said fluid inlet part with said valve seat part initially telescoped downwardly over an upper end of said fluid inlet part within said fluid outlet part and having certain portions spaced upwardly overlying an upper end of said fluid outlet part; in which said fixtures project vertically upwardly from said indexing table for receiving said assemblies of said ball cock lower unit parts in said initially telescoped condition downwardly therein when said fixtures are in said first assembly station; in which said part engagement means of said intermediate assembly ram includes means for engaging and forcing said valve seat parts of said ball cock lower unit parts from said initially telescoped to an intermediate telescoped condition with said valve seat parts more fully downwardly telescoped over said fluid inlet parts but still having said certain portions still spaced upwardly overlying said upper end of said fluid outlet part when said fixtures are at said second assembly station during carrying out said intermediate telescoping operation; in which said part engagement and reforming means of said final assembly ram includes means initially actionable for engaging and forcing said valve seat parts of said ball cock lower unit parts from said intermediate telescoped to said final telescoped condition still further telescoped downwardly with said fluid inlet parts now having said certain portions engaged with said upper ends of said fluid outlet parts and means secondarily actionable for forming portions of said fluid inlet and valve seat parts interengaged in said final telescoped condition at said third assembly station during carrying out said final telescoping operation; and in which part pick-off means is mounted at said part pick-off station adjacent said indexing table including a cam controlled movable arm having releasable pick-up means thereon for engaging and retaining upper ends of said valve seat parts of said ball cock lower unit parts from said third assembly station at said part pick-off station between said indexing table indexing movements and for transferring said ball cock lower unit parts to a discharge location displaced from said part pick-off station, and discharge activating means at said discharge location for engaging and actuating said pick-up mens to release said ball cock lower unit parts at said discharge location.

9. A production assembly mechanism as defined in claim 1 in which said intermediate assembly ram is operably connected to said final assembly ram and through said final assembly ram to said ram moving means; in which said ram moving means is adapted to move said final assembly ram and to simultaneously move said intermediate assembly ram through said final assembly ram and said operable connection between said rams; in which said telescopically assembled and interference formed parts are parts of a ball cock lower unit, each assembly including a fluid inlet part and fluid outlet part and a valve seat part, said parts in said initially telescoped condition having said fluid outlet part telescoped downwardly over an upper portion of said fluid inlet part with said valve seat part initially telescoped downwardly over an upper end of said fluid inlet part within said fluid outlet part and having certain portions spaced upwardly overlying an upper end of said fluid outlet part; in which said fixtures project vertically upwardly and are adapted to receive said assemblies of said ball cock lower unit parts in said initially telescoped condition downwardly therein when said fixtures are in said first assembly station; in which said part engagement means of said intermediate assembly ram includes means for engaging and forcing said valve seat parts of said ball cock lower unit parts from said initially telescoped to an intermediate telescoped condition with said valve seat parts more fully downwardly telescoped over said fluid inlet parts but still having said certain portions still spaced upwardly overlying said upper end of said fluid outlet parts when said fixtures are at said second assembly station during carrying out said intermediate telescoping operation; and in which said part engagement and reforming means of said final assembly ram includes means initially actionable for engaging and forcing said valve seat parts of said ball cock lower unit parts from said intermediate telescoped to said final telescoped condition still further telescoped downwardly with said fluid inlet parts now having said certain portions engaged with said upper end of said fluid outlet parts and means secondarily actionable for forming portions of said fluid inlet and valve seat parts interengaged in said final telescoped condition at said third assembly station during carrying out said final telescoping operation.

10. In a production assembly mechanism for telescopically assembled and interference formed parts, such as parts of a ball cock lower unit, the combination of: a frame; fixtures including part positioning means thereon for receiving parts to be assembled in an initially telescoped condition and for holding said parts during an intermediate telescoping operation and a final telescoping and interference forming operation, one of said fixtures being positioned on said frame at an intermediate telescoping station for holding parts to be assembled originally in said initially telescoped condition and during said intermediate telescoping operation, another of said fixtures being positioned on said frame at a final telescoping station for holding parts to be assembled originally in an intermediate telescoped condition and during said final telescoping and interference forming operation; a final assembly ram at said final telescoping station mounted movable toward and away from assembled contact with said fixture held parts at said final telescoping station, said final assembly ram including part engagement and reforming means thereon initially actionable for engaging and forcing said parts from said intermediate telescoped to a final telescoped condition and secondarily actionable for forming portions of said parts interengaged in said final telescoped condition to carry out said final telescoping operation during said assembly contact of said final assembly ram; an intermediate assembly ram at said intermediate telescoping station connected to and movable by and through said final assembly ram toward and away from assembly contact with said fixture held parts at said intermediate telescoping station, said intermediate assembly ram including part engagement means thereon for engaging and forcing said parts from said initially telescoped to said intermediate telescoped condition to carry out said intermediate telescoping operation during said assembly contact of said intermediate assembly ram; and ram moving means operably connected to said final assembly ram and through said final assembly ram to said intermediate assembly ram for simultaneously moving said rams toward and away from said assembly contacts to carry out said intermediate telescoping and said final telescoping and interference forming operations.

11. A production assembly mechanism as defined in claim 10 in which said intermediate assembly ram is mounted on and adapted for movement directly by and through said final assembly ram.

12. A production assembly mechanism as defined in claim 10 in which said part engagement and reforming means of said final assembly ram includes a telescoping portion adapted for initially engaging said parts and for forcing said parts from said intermediate telescoped to said final telescoped condition, a reforming portion adapted for engaging said parts and for forming portions of said parts interengaged while said parts are in said final telescoped condition.

13. A production assembly mechanism as defined in claim 10 in which said telescopically assembled and interference formed parts are parts of a ball cock lower unit, each assembly including a fluid inlet part and a fluid outlet part and a valve seat part, said parts in said initially telescoped condition having said fluid outlet part telescoped downwardly over an upper portion of said fluid inlet part with said valve seat part initially telescoped downwardly over an upper end of said fluid inlet part within said fluid outlet part and having certain portions spaced upwardly overlying an upper end of said fluid outlet part; in which said fixtures project vertically upwardly and said fixture at said intermediate telescoping station is adapted for initially holding said assemblies of said ball cock lower unit parts in said initially telescoped condition downwardly therein, said fixture at said final telescoping station being adapted for holding said assemblies of said ball cock lower unit parts in said intermediate telescoped condition downwardly therein; in which said part engagement means of said intermediate assembly ram is adapted for engaging and forcing said valve seat parts of said ball cock lower unit parts from said initially telescoped to said intermediate telescoped condition with said valve seat parts more fully downwardly telescoped over said fluid inlet parts but still having said certain portions still spaced upwardly overlying said upper end of said fluid outlet parts to carry out said intermediate telescoping operation; and in which said part engagement and reforming means of said final assembly ram is actionable for first engaging and forcing said valve seat parts of said ball cock lower unit parts from said intermediate telescoped to said final telescoped condition still further telescoped downwardly with said fluid inlet parts now having said certain portions engaged with said upper end of said fluid outlet parts and then for forming portions of said fluid inlet and valve seat parts interengaged in said final telescoped condition to carry out said final telescoping operation.

14. A production assembly mechanism as defined in claim 10 in which said telescopically assembled and interference formed parts are parts of a ball cock lower unit, each assembly including a fluid inlet part and a fluid outlet part and a valve seat part, said parts in said initially telescoped condition having said fluid outlet part telescoped downwardly over an upper portion of said fluid inlet part with said valve seat part initially telescoped downwardly over an upper end of said fluid inlet part within said fluid outlet part and having certain portions spaced upwardly overlying an upper end of said fluid outlet part; in which said fixtures project vertically upwardly and said fixture at said intermediate telescoping station is adapted for initially holding said assemblies of said ball cock lower unit parts in said initially telescoped condition downwardly therein, said fixture at said final telescoping station being adapted for holding said assemblies of said ball cock lower unit parts in said intermediate telescoped condition downwardly therein; in which said part engagement means of said intermediate assembly ram is adapted for engaging and forcing said valve seat parts of said ball cock lower unit parts from said initially telescoped to said intermediate telescoped condition with said valve seat parts more fully downwardly telescoped over said fluid inlet parts but still having said certain portions still spaced upwardly overlying said upper end of said fluid outlet parts to carry out said intermediate telescoping operation; in which said part engagement and reforming means of said final assembly ram is actionable for first engaging and forcing said valve seat parts of said ball cock lower unit parts from said intermediate telescoped to said final telescoped condition still further telescoped downwardly with said fluid inlet parts now having said certain portions engaged with said upper end of said fluid outlet parts and then for forming portions of said fluid inlet and valve seat parts interengaged in said final telescoped condition to carry out said final telescoping operation; and in which said fixtures at said intermediate and final telescoping stations include spring urged inwardly pivotal finger means for peripherally inwardly engaging at least said valve seat parts of said ball cock lower unit parts, said pivotal finger means being adapted for spreading outwardly against said inward spring urging during said intermediate and final telescoping operations.

15. In a production assembly mechanism for telescopically assembled and interference formed parts, such as parts of a ball cock lower unit, the combination of: A frame; a series of spaced fixtures, each of said fixtures including part positioning means thereon for receiving parts to be assembled in an initially telescoped condition and for holding said parts during an intermediate telescoping operation and a final telescoping and interference forming operation; fixture moving means mounting said fixtures on said frame for simultaneous indexing movement progressively into and between first and second and third assembly stations with there always being one of said fixtures at each of said stations between said indexing movements; each of said fixtures when in said first assembly station being positioned accessible to receive said parts to be assembled thereon with said part positioning means retaining said parts in said initially telescoped condition and holding said parts ready for indexing movement to said second assembly station; an intermediate assembly ram at said second assembly station mounted movable toward and away from assembly contact with said fixture held parts at said second assembly station, said intermediate assembly ram including part engagement means thereon for engaging and forcing said parts from said initially telescoped to an intermediate telescoped condition to carry out said intermediate telescoping operation during said assembly contact of said intermediate assembly ram; a final assembly ram at said third assembly station mounted movable toward and away from assembly contact with said fixture held parts at said third assembly station, said final assembly ram including part engagement and reforming means thereon for engaging and forcing said parts from said intermediate telescoped to a final telescoped condition and for forming portions of said parts interengaged in said final telescoped condition to carry out said final telescoping operation during said assembly contact of said final assembly ram; and ram moving means operably connected to said intermediate and final assembly rams for simultaneously moving said rams toward and away from said assembly contacts between said indexing movements of said fixture moving means and while one of said fixtures is at each of said assembly stations, said ram moving means including rotatable crank arm means operably connected to said final assembly ram for moving said final assembly ram toward and away from said assembly contact; and said intermediate assembly ram being operably connected to said final assembly ram simultaneously movable to said assembly contact by said final asembly ram during movement of said final assembly ram by said crank arm means of said ram moving means.

16. A production assembly mechanism as defined in claim 15 in which said intermediate assembly ram is secured directly to and movable by said final assembly ram; and in which said crank arm means of said ram moving means includes a crank arm operably connected to said final assembly ram and through said final assembly ram said intermeidate assembly ram for simultaneously moving said rams.

References Cited
UNITED STATES PATENTS 3,110,201   11/1963   Fusik _____ 29—211X THERON E. CONDON, Primary Examiner E. F. DESMOND, Assistant Examiner U.S. Cl. X.R.

29—208F